United States Patent
Lee et al.

(10) Patent No.: US 12,274,379 B2
(45) Date of Patent: Apr. 15, 2025

(54) FOOD MOVING STAGE AND SERVING ROBOT INCLUDING THE SAME

(71) Applicant: SAMSUNG ELECTRONICS CO., LTD., Suwon-si (KR)

(72) Inventors: Minhee Lee, Suwon-si (KR);
Sanghyun Kang, Suwon-si (KR);
Hyunsuk Kwak, Suwon-si (KR);
Donghan Koo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 232 days.

(21) Appl. No.: 17/752,471

(22) Filed: May 24, 2022

(65) Prior Publication Data
US 2022/0408944 A1     Dec. 29, 2022

Related U.S. Application Data

(63) Continuation of application No. PCT/KR2022/005984, filed on Apr. 27, 2022.

(30) Foreign Application Priority Data

Jun. 25, 2021    (KR) .................. 10-2021-0082923
Nov. 12, 2021    (KR) .................. 10-2021-0155866

(51) Int. Cl.
  *A47F 10/06*     (2006.01)
  *G05D 1/00*      (2024.01)

(52) U.S. Cl.
  CPC ........... *A47F 10/06* (2013.01); *G05D 1/0223* (2013.01)

(58) Field of Classification Search
  CPC ..... A47F 10/06; G05D 1/0223; A47B 91/005; F16M 11/08
  (Continued)

(56) References Cited

U.S. PATENT DOCUMENTS 3,771,270 A * 11/1973 Byers ................ E04H 9/023
                                                    52/167.6
4,496,130 A *  1/1985 Toyama ............. B60G 99/002
                                                    52/167.6
(Continued)

FOREIGN PATENT DOCUMENTS

CN      112621776 A     4/2021
JP      10-61250 A      3/1998
(Continued)

OTHER PUBLICATIONS

International Search Report (PCT/ISA/210) issued Aug. 9, 2022 by the International Searching Authority in International Application No. PCT/KR2022/005984.
(Continued)

*Primary Examiner* — Alfred J Wujciak
(74) *Attorney, Agent, or Firm* — Sughrue Mion, PLLC

(57) ABSTRACT

Disclosed is a food moving stage. The food moving stage includes a first plate having a plurality of concavities formed on an upper surface; a second plate of which a lower surface is disposed to face the upper surface of the first plate; a first support member connected to the upper surface of the first plate and disposed between the first plate and the second plate; a second support member connected to the lower surface of the second plate and disposed between the first plate and the first support member; a plurality of rolling members disposed on each of the plurality of concavities and are in contact with the lower surface of the second plate; and an elastic friction member disposed on the upper surface of the second support member, and based on the second plate and the second support member rising, compressed and deformed by a lower surface of the first support member.

11 Claims, 15 Drawing Sheets

(58) Field of Classification Search
USPC ........ 248/678, 663, 638, 636, 560, 562, 559
See application file for complete search history.

(56) References Cited

U.S. PATENT DOCUMENTS

| | | | | |
|---|---|---|---|---|
| 6,123,313 | A * | 9/2000 | Otsuka | ............... E04H 9/023 |
| | | | | 248/580 |
| 6,725,612 | B2 | 4/2004 | Kim | |
| 11,279,042 | B2 | 3/2022 | Ha et al. | |
| 11,370,123 | B2 | 6/2022 | Lee | |
| 2003/0077050 | A1* | 4/2003 | Marion | ............... F16M 11/22 |
| | | | | 385/52 |
| 2006/0054767 | A1* | 3/2006 | Kemeny | ............ F16M 11/041 |
| | | | | 248/346.01 |
| 2020/0290208 | A1 | 9/2020 | Ha et al. | |
| 2020/0290210 | A1 | 9/2020 | Ha et al. | |
| 2021/0139065 | A1 | 5/2021 | Ha et al. | |
| 2021/0402610 | A1 | 12/2021 | Lee | |

FOREIGN PATENT DOCUMENTS

| | | | |
|---|---|---|---|
| JP | 2008-19941 | A | 1/2008 |
| JP | 2020-149666 | A | 9/2020 |
| KR | 10-0971365 | B1 | 7/2010 |
| KR | 10-1083700 | B1 | 11/2011 |
| KR | 10-1187412 | B1 | 10/2012 |
| KR | 10-1507368 | B1 | 3/2015 |
| KR | 10-1516145 | B1 | 4/2015 |
| KR | 10-2019-0106910 | A | 9/2019 |
| KR | 10-2094884 | B1 | 3/2020 |
| KR | 10-2020-0109235 | A | 9/2020 |
| WO | 2021/125739 | A1 | 6/2021 |

OTHER PUBLICATIONS

Written Opinion (PCT/ISA/237) issued Aug. 9, 2022 by the International Searching Authority in International Application No. PCT/KR2022/005984.
Communication issued Jul. 3, 2023 by the European Patent Office in European Patent Application No. 22828594.6.

* cited by examiner

FOOD MOVING STAGE AND SERVING ROBOT INCLUDING THE SAME

CROSS-REFERENCE TO RELATED APPLICATION(S)

This application is a bypass continuation of International Application No. PCT/KR2022/005984, filed on Apr. 27, 2022, which is based on and claims priority to Korean Patent Application No. 10-2021-0082923, filed on Jun. 25, 2021, in the Korean Intellectual Property Office and Korean Patent Application No. 10-2021-0155866, filed on Nov. 12, 2021, in the Korean Intellectual Property Office, the disclosures of which are incorporated by reference herein in their entireties.

BACKGROUND

1. Field

The disclosure relates to a food moving stage and a serving robot apparatus including the same and, more specifically, to a food moving stage capable of securely delivering food by reducing vibration and a serving robot apparatus including the same.

2. Description of Related Art

According to the development of the robot technology, a robot that carries an object of serving (e.g., food) to a designated location in a restaurant or the like has been developed. However, when the serving robot rapidly accelerates or decelerates, collides with an obstacle, or when a ground is uneven, there may be a problem in that vibration or abrupt motion may be transmitted to the serving object, so that a container containing food may fall down or tip over, or food may fall out of or spill out from the container.

SUMMARY

It is an object of the disclosure to provide a food moving stage capable of securely delivering food by damping vibration and a serving robot apparatus including the same.

A food moving stage according to an embodiment may include a first plate having a plurality of grooves formed on an upper surface; a second plate of which a lower surface is disposed to face the upper surface of the first plate; a first support member connected to the upper surface of the first plate and disposed between the first plate and the second plate; a second support member connected to the lower surface of the second plate and disposed between the first plate and the first support member; a plurality of rolling members disposed on each of the plurality of grooves and are in contact with the lower surface of the second plate; and an elastic friction member disposed on the upper surface of the second support member, and based on the second plate and the second support member rising, compressed and deformed by a lower surface of the first support member.

The second support member may be disposed to pass through a central axis of the second plate, and the elastic friction member may include a first elastic friction member disposed on one end of the second support member and a second elastic friction member disposed on other end of the second support member.

The food moving stage may further include a support link configured to connect the second plate and the second support member and to which a central portion of the second support member is rotatably connected.

The food moving stage may include a plurality of first pillar members connected to an upper surface of the first plate and formed with the plurality of grooves, respectively; and a plurality of second pillar members connected to a lower surface of the second plate and disposed to face the plurality of first pillar member, respectively, so as to form a spaced space in which the rolling member is movable.

The second pillar member may include an additional groove having a vertically symmetrical shape with the groove.

The plurality of grooves may include a first groove to a fourth groove disposed in a grid shape, the plurality of rolling members may include a first roller disposed in the first groove and the second groove and a second roller disposed on the third groove and the fourth groove, and the food moving stage may further include a third plate of which an upper surface is disposed to face a lower surface of the first plate, and formed with fifth grooves to eighth grooves disposed respectively to positions corresponding to the first grooves to the fourth grooves; a third roller disposed in the fifth groove and the eighth groove and in contact with a lower surface of the first plate; and a fourth roller disposed in the sixth groove and the seventh groove and in contact with a lower surface of the first plate.

The food moving stage may further include a locking device to selectively limit a relative movement of the first plate and the second plate.

The locking device may include a rotary link rotatably disposed on the upper surface of the first plate; and a first pressure link and a second pressure link connected to the rotary link to simultaneously pressurize side surfaces of the first pillar member and the second pillar member which move in opposite directions based on the rotation of the rotary link.

The locking device may further include a first guide member and a second guide member fixedly disposed on an upper surface of the first plate to guide a moving path of the first pressure link and the second pressure link, respectively, to rise as the first pressure link and the second pressure link get closer to the first pillar member and the second pillar member.

The locking device may include a fitting member having a shape in which a cross-sectional area becomes smaller toward one end; and a first pressure link and a second pressure link disposed at left and right sides of the one end of the fitting member, and based on the fitting member moving linearly, the first pressure link and the second pressure link moving opposite directions by being pushed by one end of the fitting member so as to simultaneously pressure side surfaces of the first pillar member and the second pillar member; and an elastic member to connect the first pressure link and the second pressure link.

The locking device may include a first block disposed on the upper surface of the first plate and comprising a first tilted surface; a second block comprising a second tilted surface that engages the first tilted surface, and the second tilted surface is pressurized by the first tilted surface and rises as the first block moves linearly; and a third block connected to a lower surface of the second plate so that the raised second block is fitted.

A serving robot apparatus according to an embodiment may include a main body; a driving device to move the main body; a food moving stage comprising a first plate having a plurality of grooves formed on an upper surface, a second plate of which a lower surface is disposed to face the upper surface of the first plate, a plurality of rolling members disposed on each of the plurality of grooves and are in contact with the lower surface of the second plate, and a locking device to selectively limit a relative movement of the first plate and the second plate; at least one sensor to detect a type of a food placed on the second plate or a tilted surface on a front of the serving robot apparatus; and a processor to control the locking device to limit a relative movement of the first plate and the second plate based on information received by the at least one sensor.

The at least one sensor may include an acceleration sensor to detect acceleration of the first plate, and the processor may, based on vibration of a preset range being identified among vibration of the second plate based on information received from the acceleration sensor, control the locking device to limit a relative movement of the first plate and the second plate.

The serving robot apparatus may further include an input device to receive information about food to be served, and the processor may, based on identifying that a preset food is included in the food placed on the second plate based on the information received by the input device, control the locking device to limit a relative movement of the first plate and the second plate.

The at least one sensor may include a tilt detection sensor to detect a tilted surface on a front of the serving robot apparatus, and the processor may, based on identifying that a tilted surface is present on a front of the serving robot apparatus based on the information received by the tilt detection sensor, control the locking device to limit a relative movement of the first plate and the second plate.

The at least one sensor may include a camera to capture food placed on the second plate, and the processor may, based on identifying that preset food is placed on the second plate based on the information received by the camera, control the locking device to limit a relative movement of the first plate and the second plate.

The food moving stage may further include a first support member connected to an upper surface of the first plate and disposed between the first plate and the second plate; a second support member connected to a lower surface of the second plate and disposed between the first plate and the first support member; and an elastic friction member disposed on the upper surface of the second support member, and based on the second plate and the second support member rising, compressed and deformed by a lower surface of the first support member, and a damping force controlling device to change a normal force applied to the elastic friction member by the first support member by adjusting height of the first support member.

The processor may, based on identifying that only a beverage is included in the food placed on the second plate without soup or stew based on the information received by the camera, control the damping force controlling device to increase damping force within a first range in proportion to an amount of food.

The processor may, based on identifying that soup or stew is included in the food placed on the second plate without based on the information received by the camera, control the damping force controlling device to increase damping force within a second range greater than the first range in proportion to an amount of food.

In an embodiment, there is a food moving stage including: a first plate including an upper surface and a plurality of concavities formed on the upper surface; a second plate including a lower surface disposed to face the upper surface of the first plate; a first support member connected to the upper surface of the first plate and disposed between the first plate and the second plate; a second support member connected to the lower surface of the second plate and disposed between the first plate and the first support member; a plurality of rolling members disposed at the plurality of concavities and in contact with the lower surface of the second plate; and an elastic friction member disposed on the upper surface of the second support member, and based on the second plate and the second support member rising, configured to be compressed and deformed by a lower surface of the first support member.

In another embodiment, there is a serving robot apparatus including: a main body; a driving device to move the main body; a food moving stage including: a first plate having a plurality of concavities formed on an upper surface of the first plate, a second plate of which a lower surface is disposed to face the upper surface of the first plate, a plurality of rolling members disposed at the plurality of concavities and in contact with the lower surface of the second plate, and a locking device to selectively limit a relative movement of the first plate and the second plate; at least one sensor to detect a type of a food placed on the second plate or a tilted surface in front of the serving robot apparatus; and a processor to control the locking device to limit a relative movement of the first plate and the second plate based on information received by the at least one sensor.

DETAILED DESCRIPTION

Examples described hereinafter are for easy understanding of the disclosure, and it should be understood that various changes may be made to examples described herein and the disclosure may be embodied in different forms. In addition, in the following description, detailed descriptions of well-known functions or configurations will be omitted since they would unnecessarily obscure the subject matters of the disclosure. In addition, it should be noted that the drawings as attached are just for easy understanding of the disclosure, and are not illustrated as really scaled, and dimensions of some elements may be exaggerated.

The terms used in the present specification and the claims are general terms identified in consideration of the functions of the various embodiments of the disclosure. However, these terms may vary depending on intention, technical interpretation, emergence of new technologies, and the like of those skilled in the related art. Some terms may be selected by an applicant arbitrarily, and the meaning thereof will be described in the detailed description. Unless there is a specific definition of a term, the term may be construed based on the overall contents and technological understanding of those skilled in the related art.

In this specification, the expressions "have," "may have," "include," or "may include" or the like represent presence of a corresponding feature (for example: components such as numbers, functions, operations, or parts) and does not exclude the presence of additional feature.

Since the components required for the description of each embodiment of the disclosure have been described herein, the embodiment is not limited thereto. Thus, some components may be modified or omitted and other components may be added. In addition, the components may be distributed and arranged in different independent devices.

Furthermore, although the embodiments of the disclosure will be described in detail with reference to the accompanying drawings and the contents set forth in the accompanying drawings, the disclosure is not limited to the embodiments.

Hereinbelow, the disclosure will be described in greater detail with reference to the attached drawings.

Figure 1:
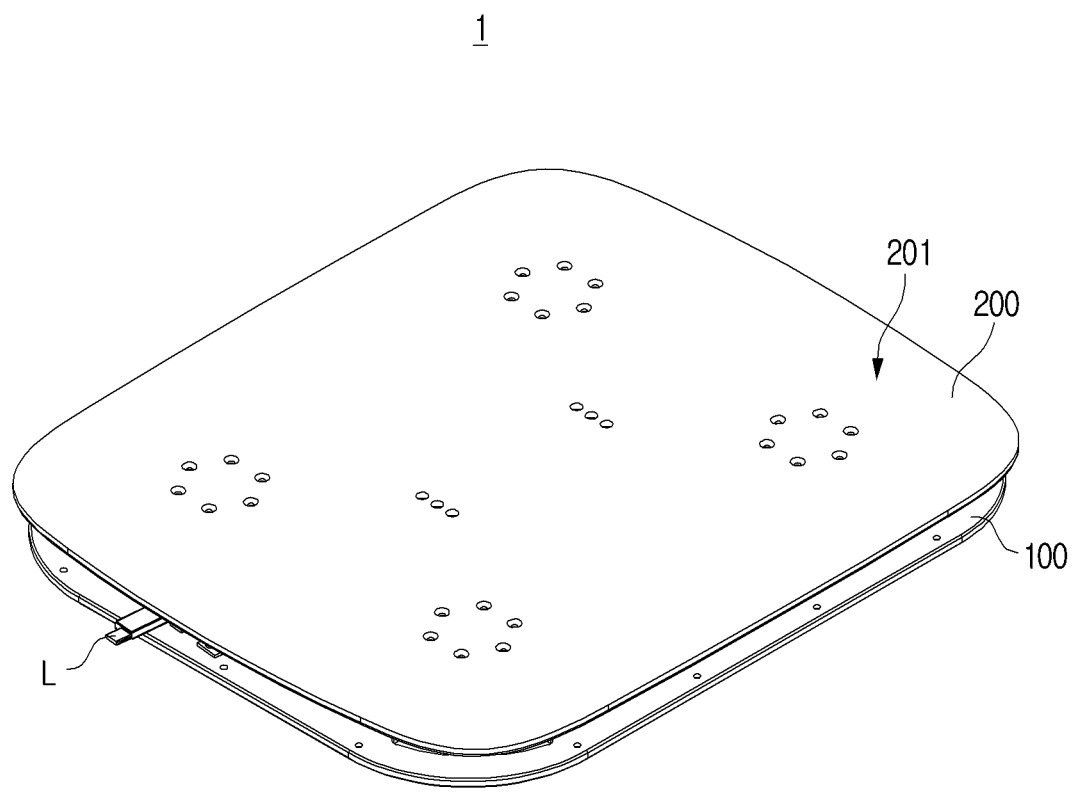
FIG. 1 is a perspective view of a food moving stage according to an embodiment of the disclosure.
Figure 2:
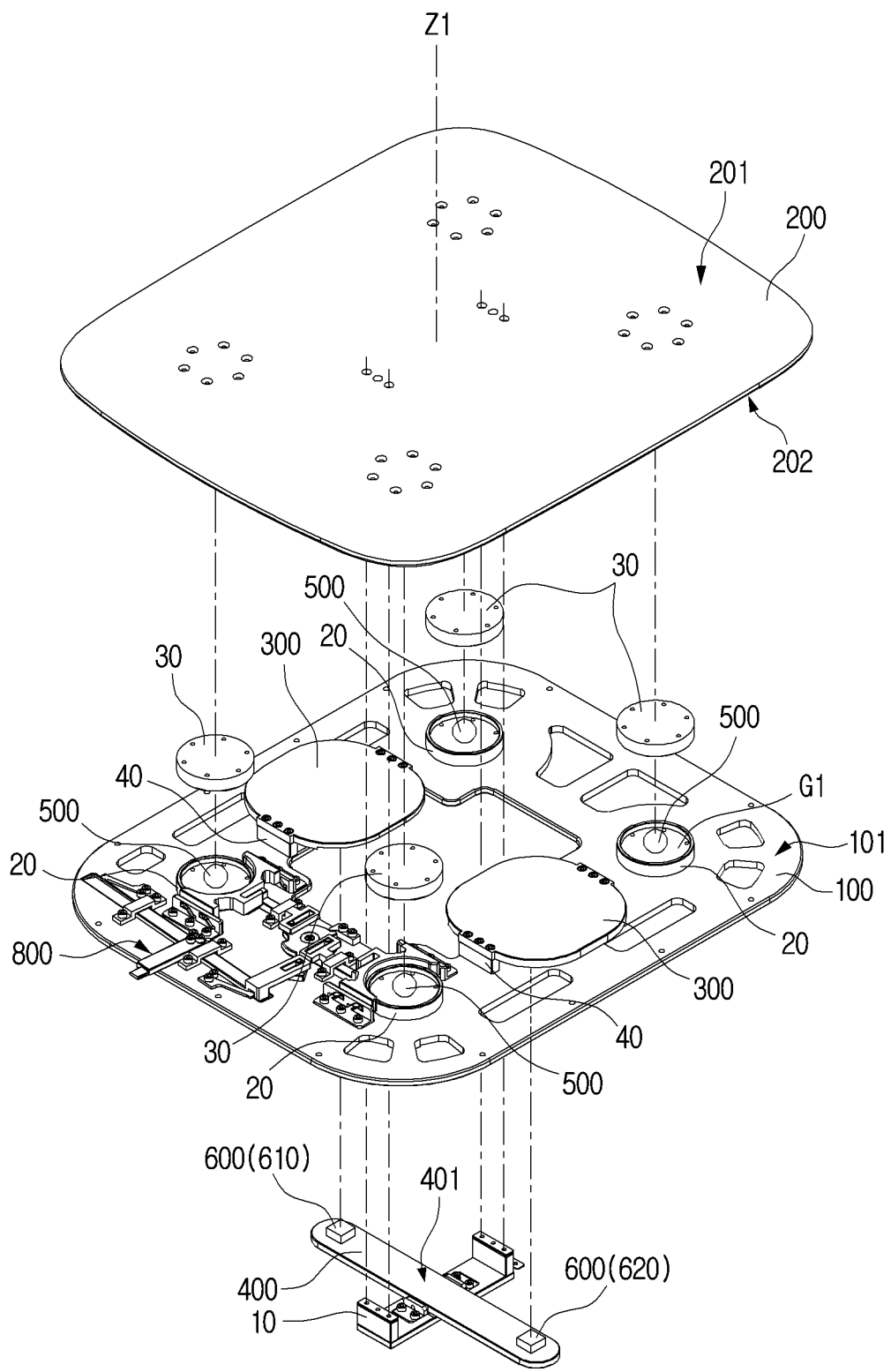
FIG. 2 is an exploded perspective view of the food moving stage of FIG. 1.

FIG. 1 is a perspective view of a food moving stage according to an embodiment of the disclosure; FIG. 2 is an exploded perspective view of the food moving stage of FIG. 1.

Referring to FIGS. 1 and 2, a food moving stage 1 according to an embodiment of the disclosure may include a first plate 100, a second plate 200, a first support member 300, a second support member 400, a plurality of rolling members 500, and an elastic friction member 600.

The first plate 100 may have a plurality of concavities G1 formed on an upper surface. The plurality of concavities G1 may have a shape where the heights of the central portions of the plurality of concavities G1 are the lowest and the heights becomes higher at greater distances from the central portions. In an embodiment, the plurality of concavities G1 may be a groove, bowl-shaped, V-shaped, or of another shape that urges the plurality of rolling members 500 toward respective centers of the plurality of concavities G1.

The second plate 200 may support an object to be moved (e.g., a container containing food) on the upper surface 201. The second plate 200 may be disposed at an upper side of the first plate 100 in parallel with the first plate 100. The second plate 200 may be disposed so that a lower surface 202 faces the upper surface 101 of the first plate 100.

As the second plate 200 is not connected to the first plate 100 and spaced apart from the first plate 100, the second plate 200 may move relative to the first plate 100. A plurality of rolling members 500, which will be described later, are disposed between the second plate 200 and the first plate 100, so that the second plate 200 may move relative to the first plate 100, i.e., when the first plate 100 is moved, the inertia of the of the second plate and the small rolling frictional force between the first plate 100 and the second plate 200 may result in relative movement between the first plate 100 and the second plate 200.

The first support member 300 may be disposed in parallel with the first and second plates 100 and 200. The first support member 300 may be connected to the upper surface 101 of the first plate 100 through the second support link 40 to move integrally with the first plate 100. The first support member 300 may be supported by a second support link 40 vertically connected to the upper surface 101 of the first plate 100.

The second support link 40 may be provided in a pair, and the lower end of the second support link 40 may be connected to the upper surface 101 of the first plate 100, and an upper end thereof may be connected to the first support member 300. Accordingly, the first support member 300 may be supported by the second support link 40 to move integrally with the first plate 100.

The first support member 300 may be disposed between the first plate 100 and the second plate 200. The first support member 300 may be spaced apart from the first plate 100 by the height of the second support link 40.

It is illustrated that two first support members 300 are provided, but the number is not limited thereto and the first support member 300 may be one or not less than three.

The second support member 400 may be disposed in parallel with the first plate 100, the second plate 200, and the first support member 300. The second support member 400 may be connected to the lower surface 202 of the second plate 200 and may move integrally with the second plate 200. The second support member 400 may be disposed between the first plate 100 and the first support member 300.

The plurality of rolling members 500 may be disposed in the plurality of concavities G1, respectively. The number of the plurality of rolling members 500 may be the same as the number of the plurality of concavities G1. The rolling member 500 may have a shape of a sphere, but the shape of the rolling member 500 is not limited thereto, but may have a cylindrical shape as described below.

The plurality of rolling members 500 may be in contact with the lower surface 202 of the second plate 200. The rolling member 500 may be located at the lowest point of the concavity G1 and rotate or spin by the vibration or movement of the first plate 100, so that the rolling member 500 moves to a higher place within the concavity G1. The second plate 200 may move relatively to the first plate 100 although there is a small rolling friction coefficient (e.g., 0.001 to 0.01) between the first plate 100 and the second plate 200. At this time, the second plate 200 may move up or down by the movement of the rolling member 500 in the concavity G1.

Since the rolling member 500 is disposed at the concavity G1 where the central portion is lowest, the rolling member 500 may rise higher as the rolling member 500 moves away from the center of the concavity G1. Accordingly, since the lower surface 202 of the second plate 200 is supported by the rolling member 500, the second plate 200 may rise higher as the second plate 200 moves in the horizontal direction with respect to the first plate 100, and the second support member 400, which moves integrally with the second plate 200, may also rise higher as the second support member 400 moves farther in the horizontal direction with respect to the first plate 100.

If the second plate 200 returns to the original position without being continuously vibrated or moved after the second plate 200 vibrates or moves once, the damping of the vibration or movement of the second plate 200 may be necessary. In particular, the second plate 200 must move relative to the first plate 100 in consideration of a sufficiently low rolling friction coefficient of the rolling member 500, but may require damping of vibration or movement after being moved away by an amount greater than a predetermined distance from the center of the first plate 100. Accordingly, the food moving stage 1 may include an elastic friction member 600.

The elastic friction member 600 may be disposed on the upper surface 401 of the second support member 400. The elastic friction member 600 may be fixedly disposed at a predetermined position of the upper surface 401 of the second support member 400. When the elastic friction member 600 is pressed up and down, the elastic properties of the elastic friction member 600 may urge the elastic member 600 to return to its original state. The elastic friction member 600 may have an increased elastic force in proportion to a degree at which the elastic friction member 600 is pressed upward or downward.

The elastic friction member 600 may be formed of a poron sponge, but the material is not limited thereto.

When the second plate 200 and the second support member 400 rise, the elastic friction member 600 may be compressed and deformed on the lower surface of the first support member 300. Specifically, when the first plate 100 vibrates or moves, the rolling member 500 may rise as it rotates on the concavity G1, and, as a result, the second plate 200 and the second support member 400 may rise while moving away from the center of the first plate 100.

As described above, as the second plate 200 moves away from the center of the first plate 100, the second plate 200 may further rise, so that the elastic friction member 600 disposed between the rising second support member 400 and the first support member 300 positioned at a fixed height may be further compressed in proportion to the horizontal movement distance of the second plate 200.

The elastic force according to the compression of the elastic friction member 600 may act on the lower surface of the first support member 300, and thus the normal force may be applied to the elastic friction member 600 by the first support member 300. The normal force applied to the elastic friction member 600 and the friction force according thereto may increase in proportion to the horizontal movement distance of the second plate 200. The friction force applied to the elastic friction member 600 by the first support member 300 may be transferred to the second plate 200.

Figure 3:
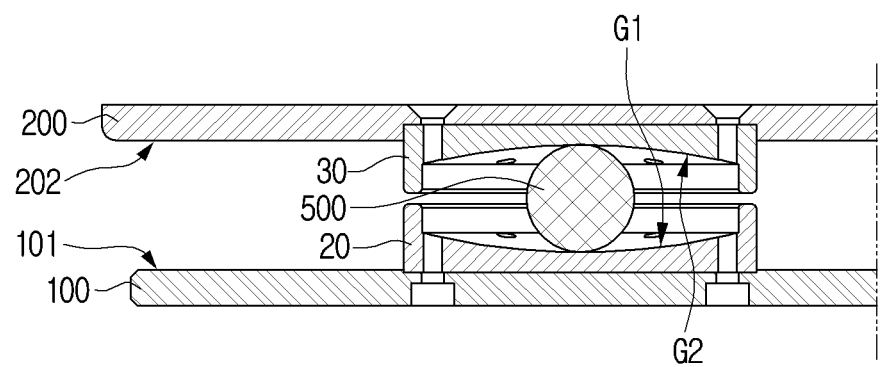
FIGS. 3 and 4 are diagrams illustrating a rotational operation of a rolling member.
Figure 4:
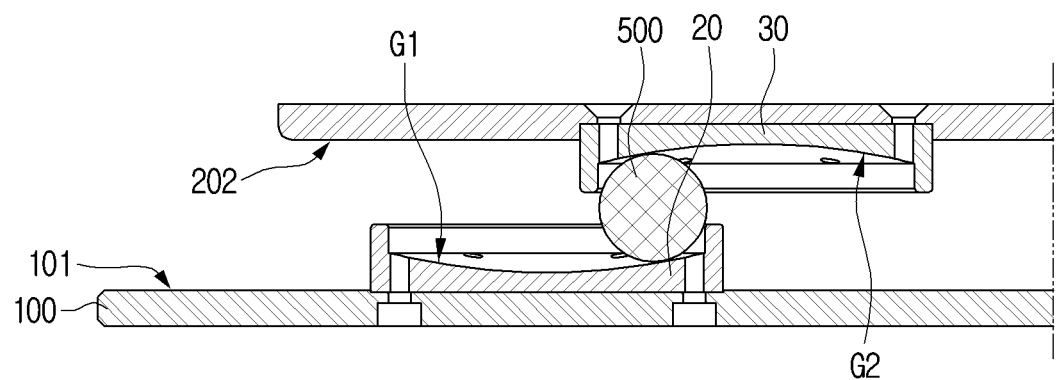

FIGS. 3 and 4 are diagrams illustrating a rotational operation of a rolling member.

Referring to FIGS. 3 and 4, the food moving stage 1 according to an embodiment may include a plurality of first pillar members 20 and a plurality of second pillar members 30.

The plurality of first pillar members 20 may be connected to the upper surface 101 of the first plate 100, and a plurality of grooves G1 may be formed. The first pillar member 20 may move integrally with the first plate 100. The first pillar member 20 may protrude upward from the upper surface 101 of the first plate 100.

The plurality of second pillar members 30 may be connected to the lower surface 202 of the second plate 200, and are arranged to face the plurality of first pillar members 20, respectively, so that a space in which the rolling member 500 is movable may be formed. The second pillar member 30 may move integrally with the second plate 200. The second pillar member 30 may protrude downward from the lower surface 202 of the second plate 200.

The first and second pillar members 20 and 30 may be spaced apart from each other, and the rolling member 500 is disposed between the first and second pillar members 20 and 30 so that the first and second pillar members 20 move relative to each other. The first and second pillar members 20 and 30 may be spaced apart from each other by a distance smaller than the diameter of the rolling member 500, and the rolling member 500 may stop at the inner wall of the first and second pillar members 20 and 30 without leaving or falling out of the groove G1.

The second pillar member 30 may include concavity G2 having a shape that is vertically symmetric with the shape of the concavity G1. The concavity G2 may have a concave shape so that the central portion is highest in height and the height decreases the further away from the central portion.

The rolling member 500 may have an equilibrium state of returning to the central portion even if the rolling member 500 moves away from the central portion of the concavity G1 and the additional concavity G2. Accordingly, even if the first plate 100 vibrates or moves, the second plate 200 may easily return to the initial position in the equilibrium state.

The rolling member 500 may be positioned at the lowest point of the concavity G1, then rotate due to the vibration or movement of the first plate 100, and may move to a higher point of the concavity G1, and the second plate 200 may move upward by the rotations of the rolling member 500.

In this example, even though the rolling friction between the rolling member 500 and the concavity G1 and concavity G2 is small, the vibration or movement of the second plate 200 may due to the vibration or movement of the first plate 100, may be damped. Accordingly, the food container supported by the second plate 200 may not fall and food may not be separated from the container, so the food moving stage 1 may securely move the food.

Figure 5:
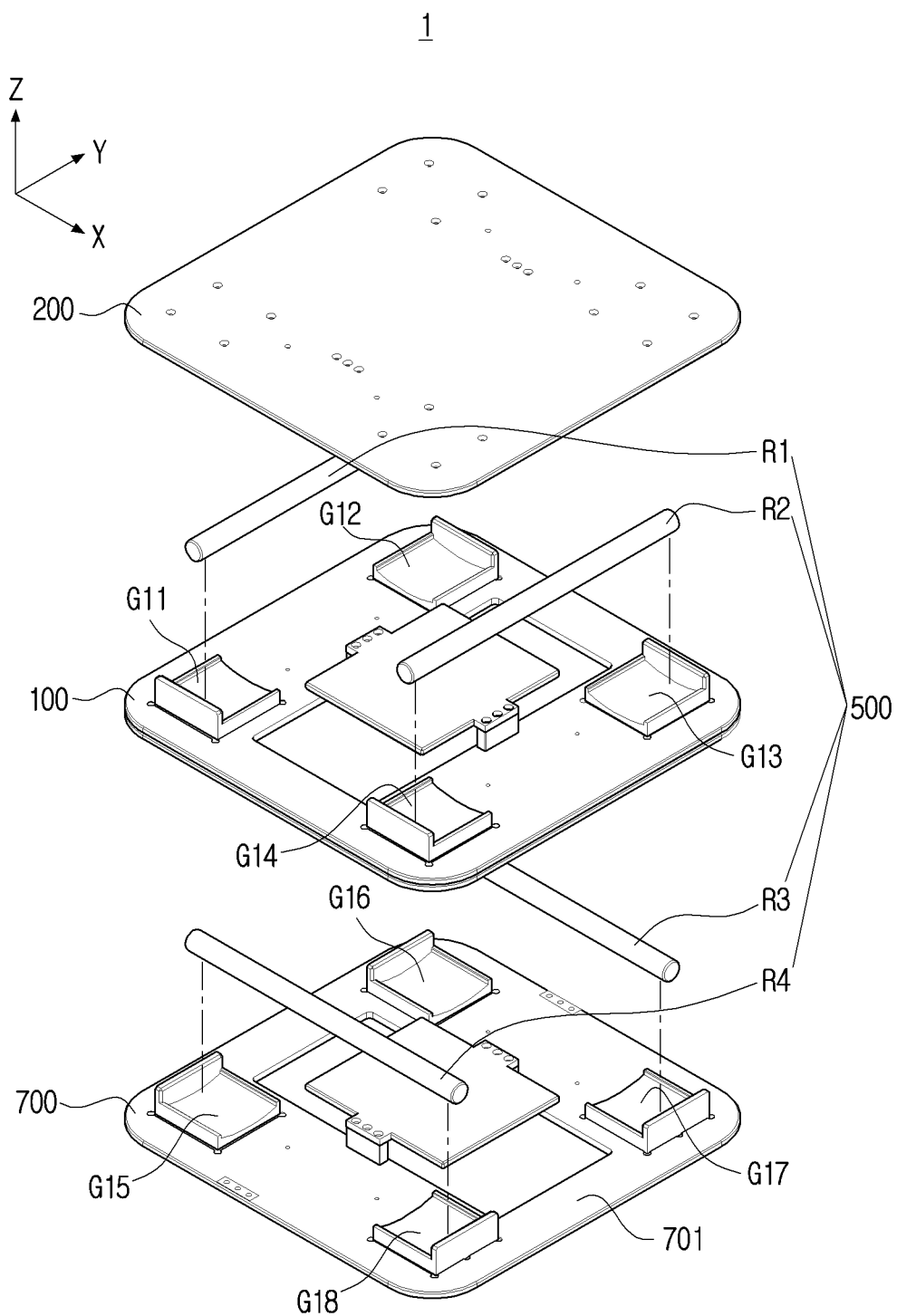
FIG. 5 is a diagram illustrating a structure that a plurality of rolling members are implemented with four rollers.

FIG. 5 is a diagram illustrating a structure that a plurality of rolling members are implemented with four rollers (e.g., pins).

Referring to FIG. 5, the plurality of grooves G1 may include first to fourth grooves G11, G12, G13, and G14 arranged in a grid shape. The cross-section of the first plate 100 has an approximately rectangular shape, and the first to fourth grooves G11, G12, G13, and G14 may be disposed adjacent to the corner portions of the first plate 100, but the shapes and positions thereof are not limited thereto.

The plurality of rolling members 500 may include a first roller R1 disposed on the first and second grooves G11 and G12, and a second roller R2 disposed on the third and fourth grooves G13 and G14. The first and second rollers R1 and R2 may be disposed in an elongated manner along the Y-axis, and may rotate about each rotation axis. The first to fourth grooves G11, G12, G13, and G14 may have a concave shape in which the center portion is lowest, and the height rises at greater the distance from the central portion with respect to the X-axis direction. The first roller R1 and the second roller R2 may be in contact with the lower surface 202 of the second plate 200.

The food moving stage 1 may further include a third plate 700, a third roller R3, and a fourth roller R4.

The third plate 700 may be horizontally disposed in parallel with the first plate 100 and the second plate 200. The third plate 700 may be disposed so that an upper surface 701 faces the lower surface 102 of the first plate 100, and the fifth to eighth grooves G15, G16, G17, and G18 may be formed on the upper surface 701 corresponding to the first to fourth grooves G11, G12, G13, and G14, respectively. The first to fourth grooves G11, G12, G13, and G14 may be located on the same vertical axis as the fifth to eighth grooves G15, G16, G17, and G18, respectively.

The fifth groove to the eighth groove G15, G16, G17, and G18 may have a concave shape in which the central portion is lowest, and the height rising at greater the distance from the central portion toward the Y-axis direction.

The third roller R3 may be disposed in the sixth and seventh grooves G16 and G17 and may be in contact with the lower surface 102 of the first plate 100. The fourth roller R4 may be disposed in the fifth and eighth grooves G15 and G18 and may be in contact with the lower surface of the first plate 100.

The food moving stage 1 shown in FIG. 5 may include a three-layer plate, eight grooves, and four rollers. Accordingly, the vibration or motion of the Y-axis component may be dampened by the third and fourth rollers R3 and R4 between the third plate 700 and the first plate 100, and the vibration or motion of the X-axis component may be dampened by the first and second rollers R1 and R2 between the first plate 100 and the second plate 200.

Accordingly, a food container supported by the uppermost second plate 200 may not fall or tip over, and may not be separated, fall out, or spill out from the food container, so that the food moving stage 1 may securely move the food.

Figure 6:
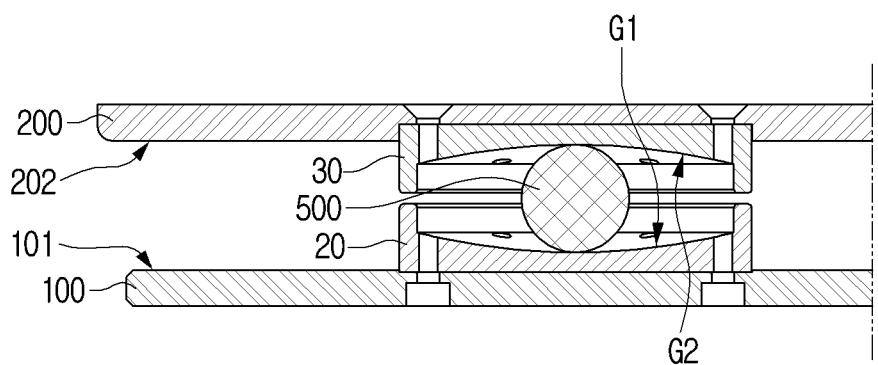
FIGS. 6 and 7 are diagrams illustrating a compression process of an elastic friction member.
Figure 6:
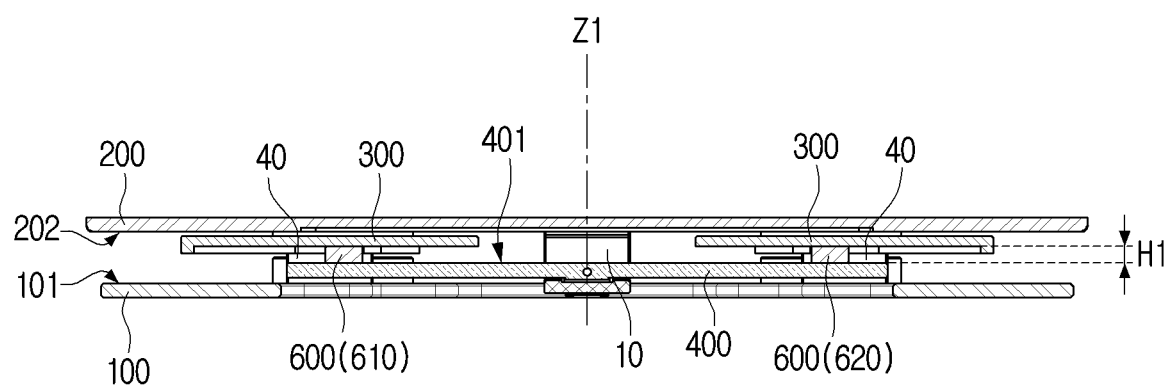
Figure 7:
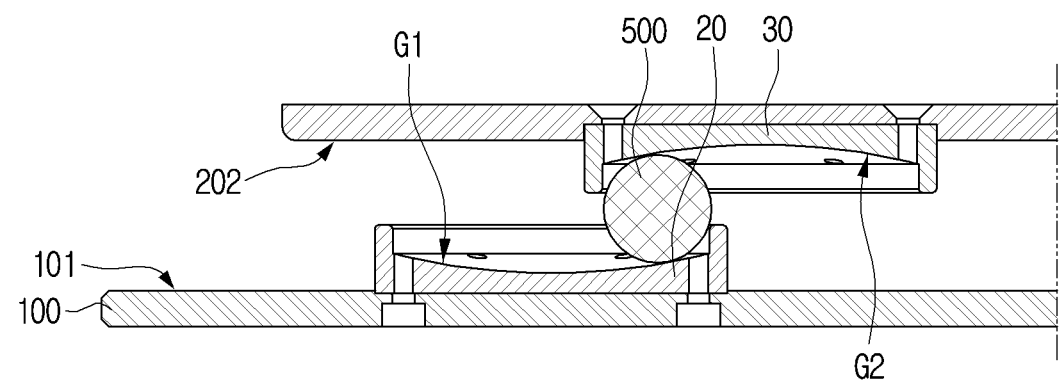
Figure 7:
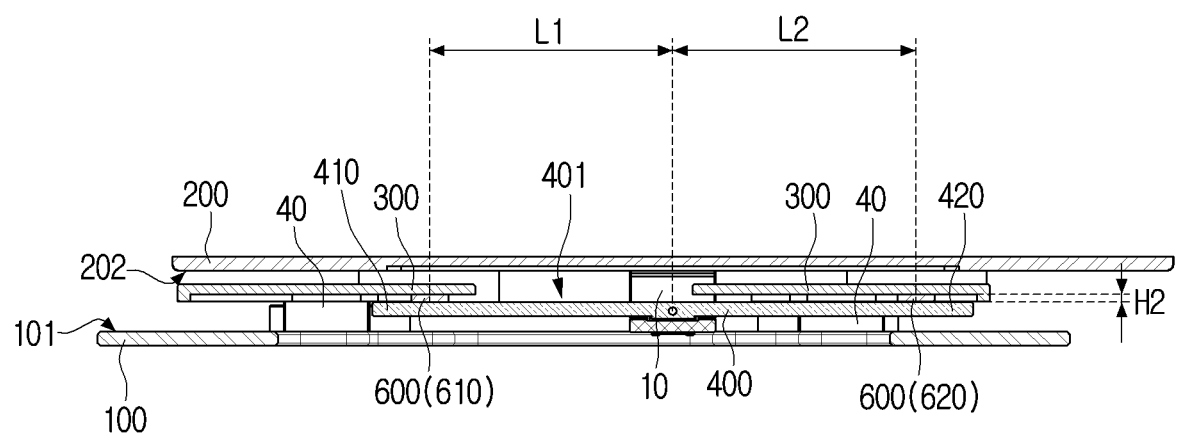

FIGS. 6 and 7 are diagrams illustrating a compression process of an elastic friction member.

Referring to FIGS. 6 and 7, when the first plate 100 vibrates or moves, the rolling member 500, the second plate 200, and the second support member 400 may rise. When the second plate 200 and the second support member 400 rise, the elastic friction member 600 may be compressed and deformed on the lower surface of the first support member 300.

As described above, since the rolling member 500 rises higher as it moves away from the central portion of the groove G1, the second plate 200 may also rise higher as the second plate 200 moves in the horizontal direction with respect to the first plate 100, and the second support member 400 and the elastic friction member 600, which move integrally with the second plate 200, may rise higher as the second plate 200 moves away from the first plate 100 in the horizontal direction.

The distance between the upper surface 401 of the second support member 400 and the lower surface of the first support member 300 may decrease from H1 to H2, and the value of H2 may become smaller as the second plate 200 moves away in the horizontal direction with respect to the first plate 100.

The normal force and the friction force acting on the elastic friction member 600 by the first support member 300 may become larger as the second plate 200 moves further out in the horizontal direction with respect to the first plate 100.

Accordingly, when the second plate 200 moves away from the center of the first plate 100 by only a small distance, a small frictional force is applied to the elastic friction member 600, so that the vibration or the movement of the second plate 200 in response to the vibration or the movement of the first plate 100 may minimally damped, even though the rolling friction of the rolling member 500 with the groove G1 and G2 is small.

When the second plate 200 moves away from the center of the first plate 100 by a large distance, a large frictional force is applied to the elastic friction member 600, so that the vibration or movement of the second plate 200 may be dampened at greater amounts and returned to the original position without continuous vibration or motion.

According to the above-described movement of the second plate 200, since the vibration generated by the serving robot apparatus 1000 is absorbed by the food moving stage 1, the serving robot apparatus 1000 may securely move the food supported by the second plate 200.

The second support member 400 may be disposed to pass through the central axis Z1 of the second plate 200. The elastic friction member 600 may include a first elastic friction member 610 disposed at one distal end 410 of the second support member 400 and a second elastic friction member 620 disposed on the other distal end 420 of the second support member 400.

Since the frictional force is applied to two places spaced apart from the central axis Z1 of the second plate 200 by the first and second elastic friction members 620, rotational vibration (e.g., yaw rotation) with respect to the Z-axis of the second plate 200 may be sufficiently dampened.

The food moving stage 1 may further include a first support link 10 connecting the second plate 200 and the second support member 400, and to which the central portion of the second support member 400 is rotatably connected.

The central portion of the second support member 400 may be rotatably connected to the first support link 10, the first elastic friction member 610 may be spaced apart from the central portion by a distance of D1, the second elastic friction member 620 may be separated from the central portion by a distance of D2, and D1 and D2 may have the same value.

Accordingly, the normal force and the frictional force acting on the first and second elastic friction members 610 and 620 may be equal to each other by the first support member 300. The vibration of the second plate 200 may be more quickly dampened by a frictional force that is symmetrically applied by the first and second elastic friction members 610 and 620.

Figure 8:
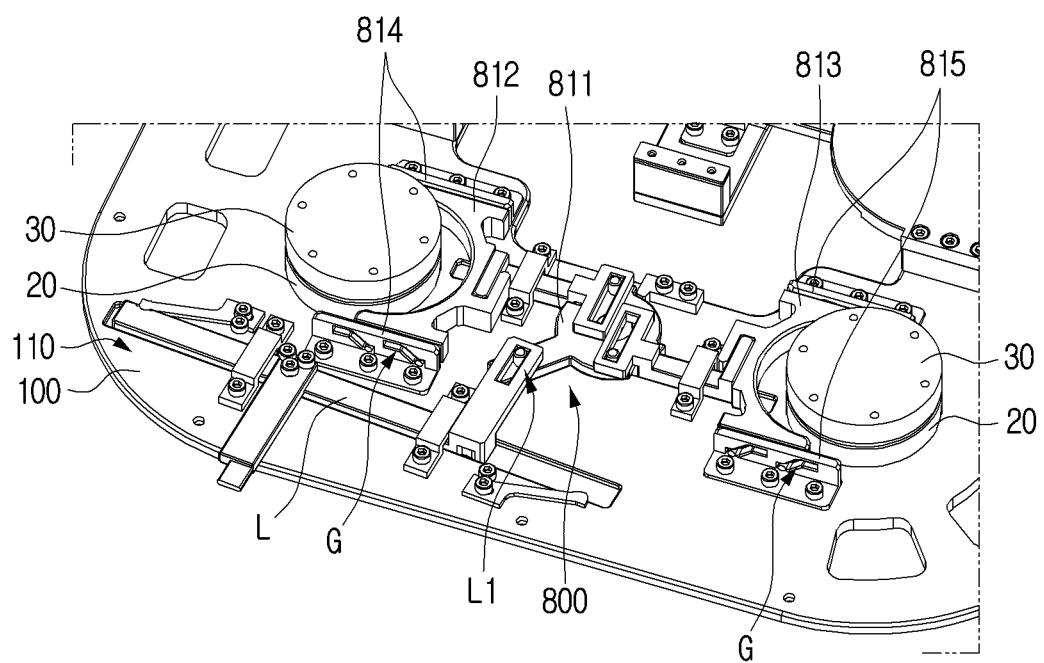
FIGS. 8 and 9 are diagrams illustrating a locking operation of locking device according to an embodiment of the disclosure.
Figure 9:
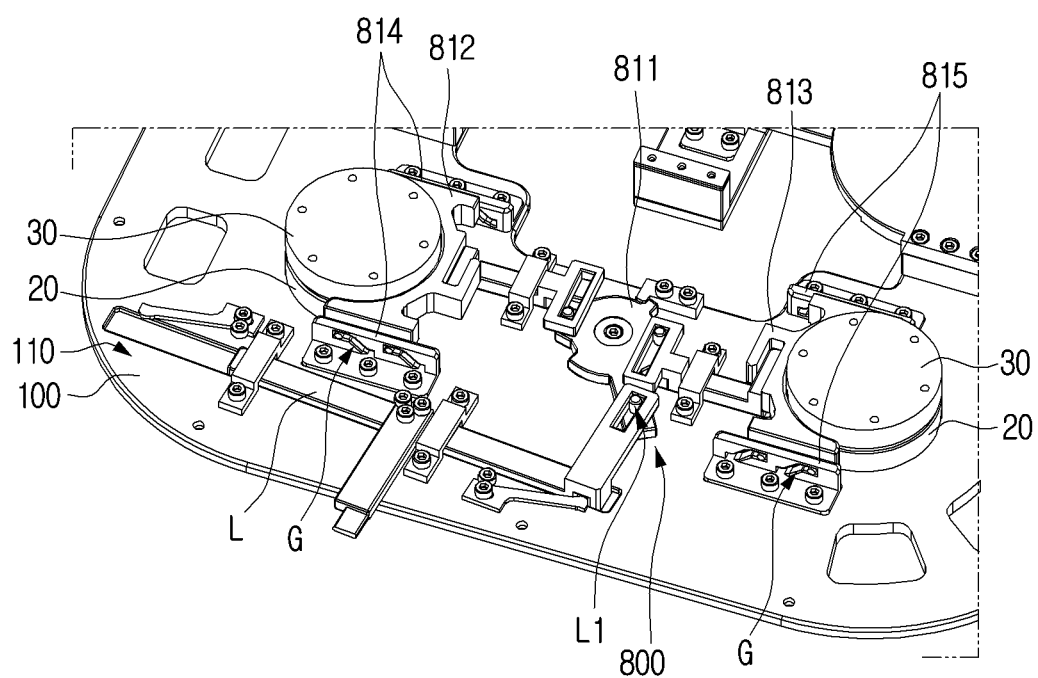

FIGS. 8 and 9 are diagrams illustrating a locking operation of locking device according to an embodiment of the disclosure. The structure of a locking device 800 described through FIGS. 8 and 9 may be added to various embodiments of the food moving stage 1 described above.

Referring to FIGS. 8 and 9, the food moving stage 1 may further include a locking device 800 that selectively restricts relative movement of the first plate 100 and the second plate 200. FIG. 8 shows a locking release state, and FIG. 9 shows a locking state.

For example, if no liquid is included in the transferred food, and there is no risk of spilling food, the user may selectively manually operate the locking device 800 to limit the relative movement of the first and second plates 100, 200. Alternatively, the food moving stage 1 may limit the relative movement of the first and second plates 100 and 200 by automatically operating the locking device 800 after determining whether to lock according to the sensing result of the sensor to be described later.

The first plate 100 and the second plate 200 may be integrally connected to each other by the locking device 800. In addition, the locking device 800 may be manually operated by a user or may be automatically operated by a motor.

The locking device 800 may include a rotary link 811, a first pressure link 812, and a second pressure link 813.

The rotary link 811 may be rotatably disposed on the upper surface 110 of the first plate 100. The rotary link 811 may be connected to one end L1 of a lever L and may convert the linear movement of the lever L into a rotational movement.

The first and second pressure links 812 and 813 may be connected to the rotary link 811. For example, the first and second pressure links 812 and 813 may be located opposite to each other with respect to the center of the rotary link 811.

The first and second pressure links 812 and 813 may simultaneously move to be in contact with or to compress the sides of the first and second pillar members 20 and 30 as the rotary link 811 rotates in the opposite direction.

In other words, the first and second pressure links 812 and 813 may function to brake the first and second pillar members 20 and 30 from moving relative to each other at two different points. Accordingly, the relative movement of the first and second pillar members 20 and 30 is not possible, and the second plate 200 may move at the same speed as the first plate 100 on the lower side.

The locking device 800 may further include first and second guide members 814 and 815. The first and second guide members 814 and 815 may be fixedly disposed on the upper surface 110 of the first plate 100, and may guide movement paths of the first and second pressure links 812 and 813 to rise as the first and second pressure links 812 and 813 approach the first and second pillar members 20 and 30, respectively.

The first and second guide members 814 and 815 may include grooves or holes (e.g., grooves or holes) which are fitted with first and second pressure links 812, 813 and having a rising shape.

Since the first and second pressure links 812 and 813 are disposed adjacent to the upper surface 110 of the first plate 100 in an unlocked state, the second pillar member 30 is disposed at a lower height than the second pillar member 30 even when the second pillar member 30 is relatively moved in the horizontal direction with respect to the first pillar member 20, and movement of the second pillar member 30 may not be interfered with.

Due to the shape of the grooves or holes, first and second pressure links 812 and 813 rise while moving closer to the first and second pillar members 20 and 30 and may simultaneously press the sides of the first and second pillar members 20 and 30, respectively, according to the first and second guide members 814 and 815. Accordingly, the locking device 800 may have a more compact size.

Figure 10:
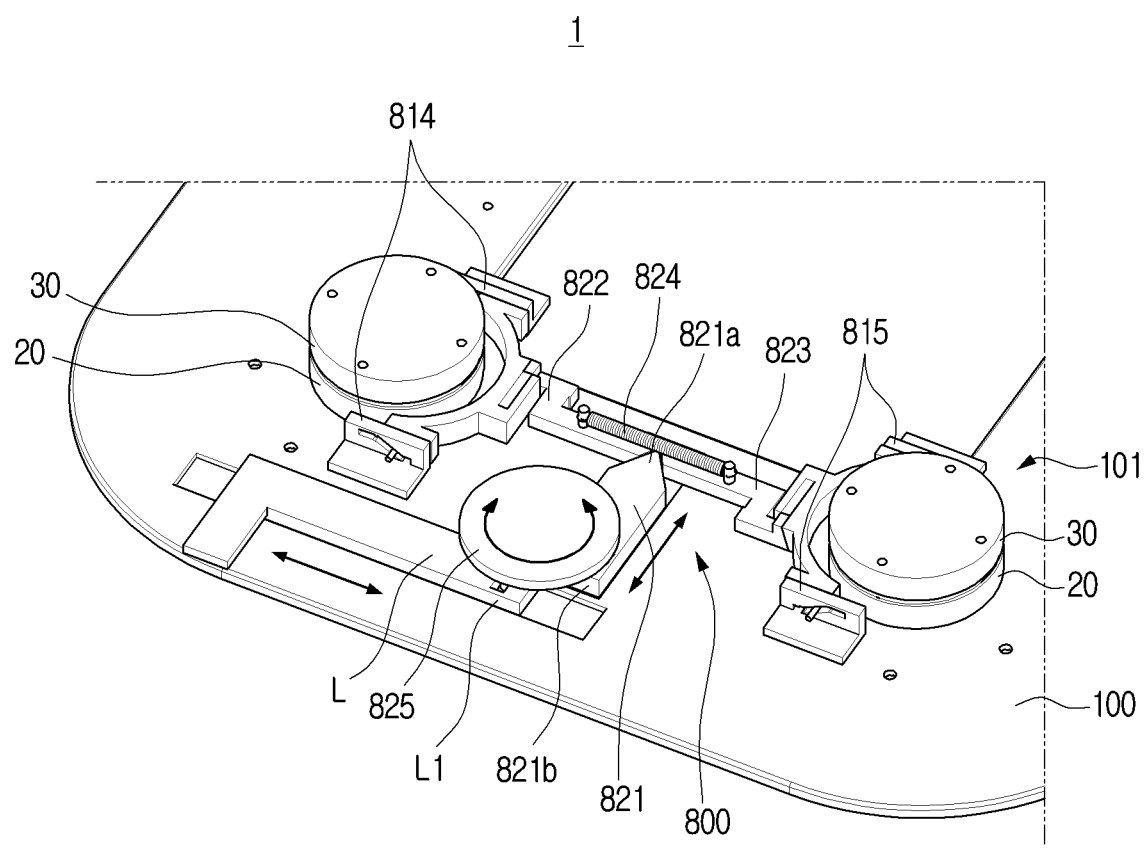
FIGS. 10 and 11 are diagrams illustrating a locking device according to another embodiment of the disclosure.
Figure 11:
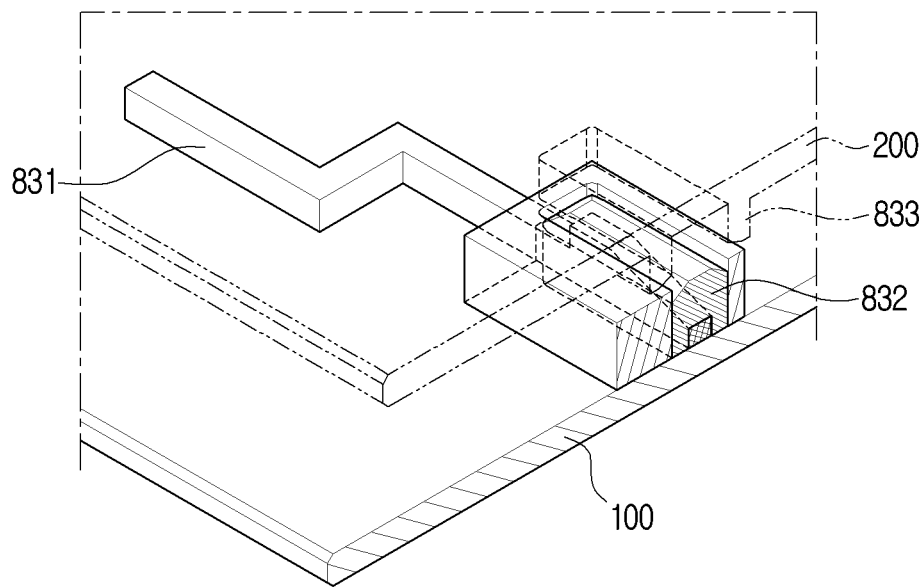
Figure 11:
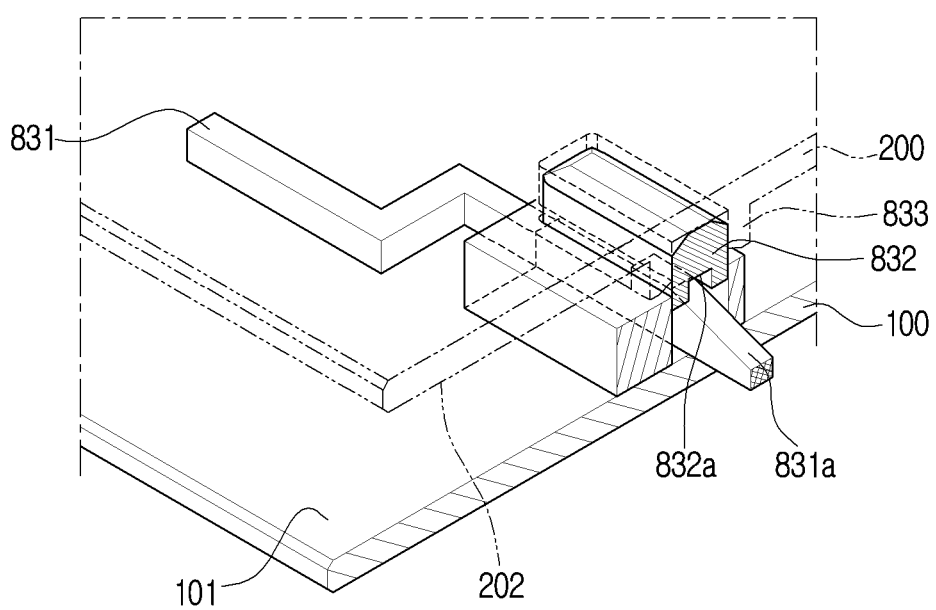

FIGS. 10 and 11 are diagrams illustrating a locking device according to another embodiment of the disclosure. The structure of the locking device 800 illustrated through FIGS. 10 and 11 may be added to various embodiments of the food moving stage 1 described above.

Referring to FIG. 10, the locking device 800 may include a fitting member 821, a first pressure link 822, a second pressure link 823, and an elastic member 824.

The fitting member 821 may have a shape in which the cross-sectional area of the fitting member 821 becomes smaller toward one end 821a. The first and second pressure links 822 and 823 may be disposed at left and right sides of one end 821a of the fitting member 821, and the first and second pressure links 822, 823 may have a shape that engages one end 821a of the fitting member 821.

The fitting member 821 may move linearly toward the first and second pressure links 822 and 823 by the lever L. For example, when the lever L linearly moves in one direction, the circular link 825 connected to one end of the lever L may rotate. The fitting member of which the other end is connected to the circular link 825 may move linearly toward the first and second pressure links 822 and 823 in a direction different from the lever L.

When the fitting member 821 moves linearly, the first and second pressure links 822 and 823 may simultaneously press the sides of the first and second pillar members 20 and 30 as the first and second pressure links 822 and 823 are pushed in opposite directions by being pushed by one end 821a of the fitting member 821. Accordingly, since the relative movement of the first and second pillar members 20 and 30 is impossible, the food moving stage 1 may be locked.

The elastic member 824 may connect the first and second pressure links 822 and 823. Accordingly, when the fitting member 821 moves backward, the first and second pressure links 822 and 823 are again moved back by the elastic force of the elastic member 824, so that the food moving stage 1 may be unlocked.

Referring to FIG. 11, the locking device 800 may include a first block 831, a second block 832, and a third block 833. The first block 831 may be disposed on the upper surface 101 of the first plate 100 and may include a first tilted surface 831a. The second block 832 may include a second tilted surface 832a that engages the first tilted surface 831a. In addition, the second block 832 may be vertically moved with respect to the first plate 100, and may be inserted into the upper surface 101 of the first plate 100 so that horizontal movement is impossible.

Accordingly, as the first block 831 moves linearly, the second tilted surface 832a of the second block 832 may be pressed by the first tilted surface 831a and may rise. The third block 833 may be connected to the lower surface 202 of the second plate 200 so that the raised second block 832 may be fitted.

When the first block 831 moves toward the second block 832 and the second block 832 rises and fits into the third block 833, the second plate 200 may not move relative to the first plate 100. Accordingly, since the first plate 100 and the second plate 200 are integrally connected to each other by the locking device 800 for moving, the food moving stage 1 may be locked.

After the first block 831 moves backward, the second block 832 may drop and moves away from the third block 833, the first and second plates 100 and 200 may move relative to each other, and the food moving stage 1 may be unlocked.

Figure 12:
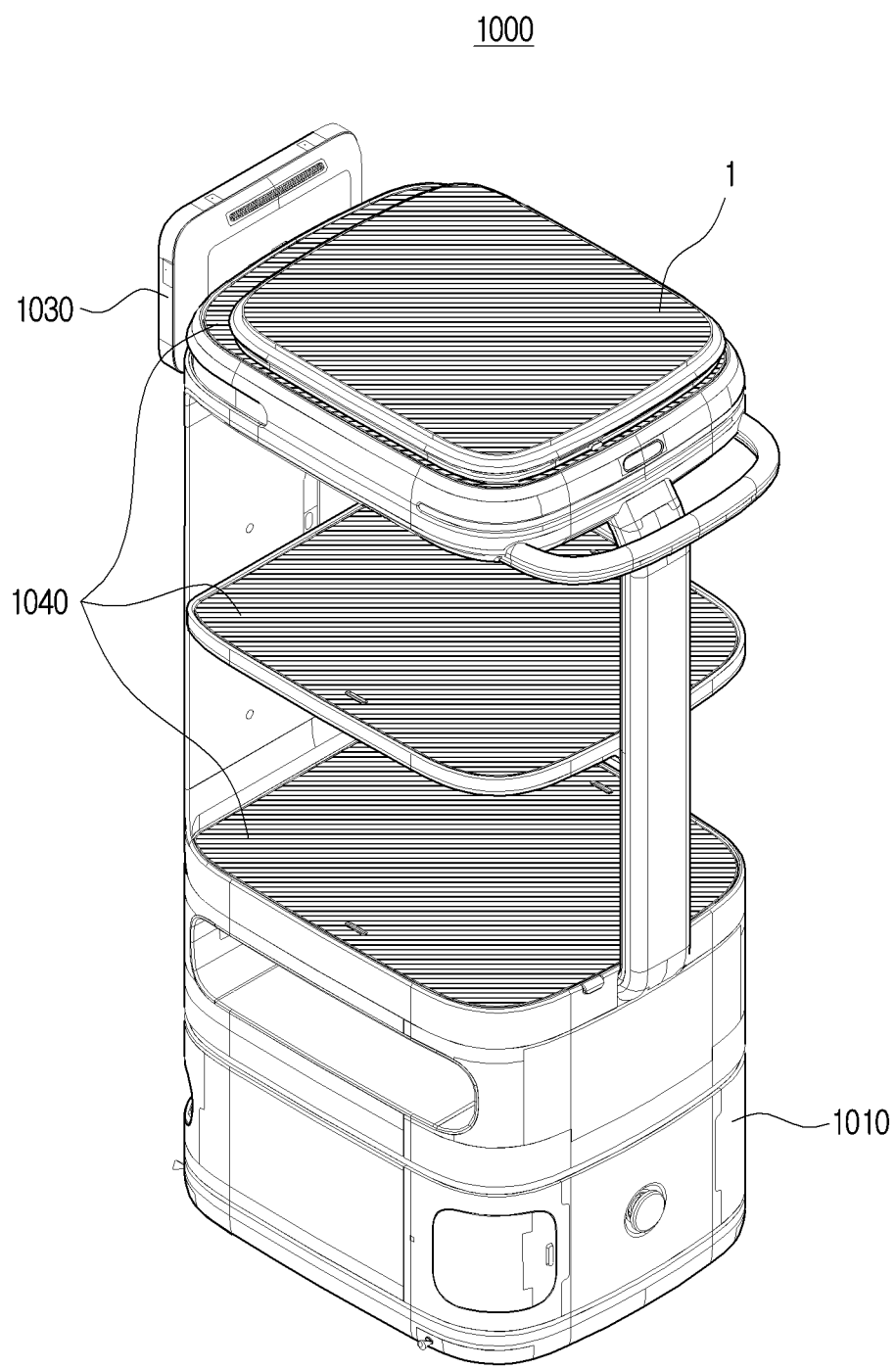
FIG. 12 is a perspective view of a serving robot apparatus according to an embodiment of the disclosure.
Figure 13:
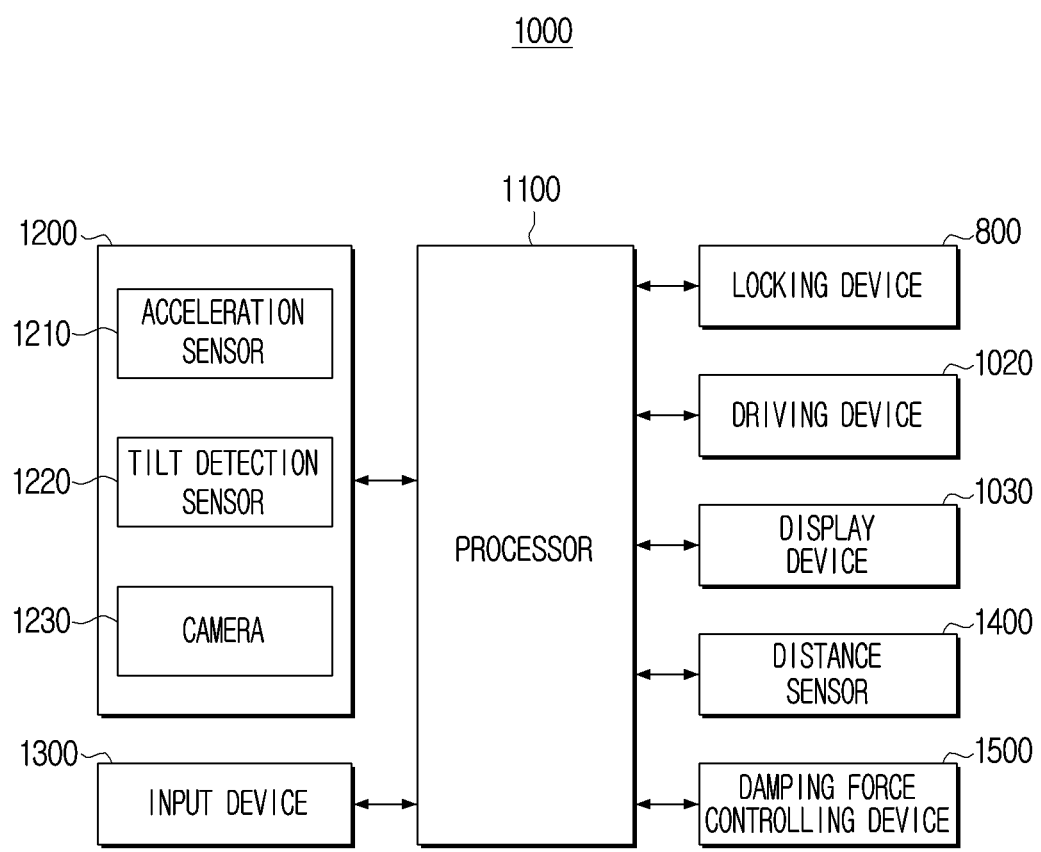
FIG. 13 is a block diagram schematically illustrating a control process of a serving robot apparatus.

FIG. 12 is a perspective view of a serving robot apparatus according to an embodiment of the disclosure. FIG. 13 is a block diagram schematically illustrating a control process of a serving robot apparatus.

The serving robot apparatus 1000 according to an embodiment of the disclosure may include a main body 1010, a driving device 1020 for moving the main body 1010, a processor 1100, at least one sensor 1200, and a food moving stage 1 horizontally supported by the main body 1010. The food moving stage 1 may include a locking device 800 that selectively restricts relative movement of the first plate 100 and the second plate 200.

When the user puts a container containing food on the serving robot apparatus 1000 and designates a table for serving, the serving robot apparatus 1000 may move to a designated table for serving food. The serving robot apparatus 1000 may also include a display device 1030 that represents information regarding the serving of the food (e.g., a type of food, an arrival table location, etc.).

Specifically, the serving robot apparatus 1000 may include a plurality of tray members 1040 horizontally disposed in parallel with each other, and the food moving stage 1 may be detachably attached to at least one of the plurality of tray members 1040.

The processor 1100 may control the overall operation of the serving robot apparatus 1000. The processor 1100 may include one or more of a central processing unit (CPU), an application processor (AP), or a communication processor (CP). The processor 900 may be a micro-controller (MCU).

The processor 1100 may drive an operating system or application program to control hardware or software components connected to the processor 1100 and perform various data processing and operations. The processor 1100 may also load instructions or data received from at least one of the other components into the volatile memory and store the various data in the non-volatile memory.

The processor 1100 may control the locking device 800 to limit the relative movement of the first and second plates 100 and 200 based on the information received by the at least one sensor 1200.

At least one sensor 1200 may include at least one of an acceleration sensor 1210, a tilt detection sensor 1220, or a camera 1230.

The serving robot apparatus 1000 may further include a damping force controlling device 1500 that adjusts the height of the first support member 300 of the food moving stage 1 to change a normal force acting on the elastic friction member 600 by the first support member 300.

Figure 14:
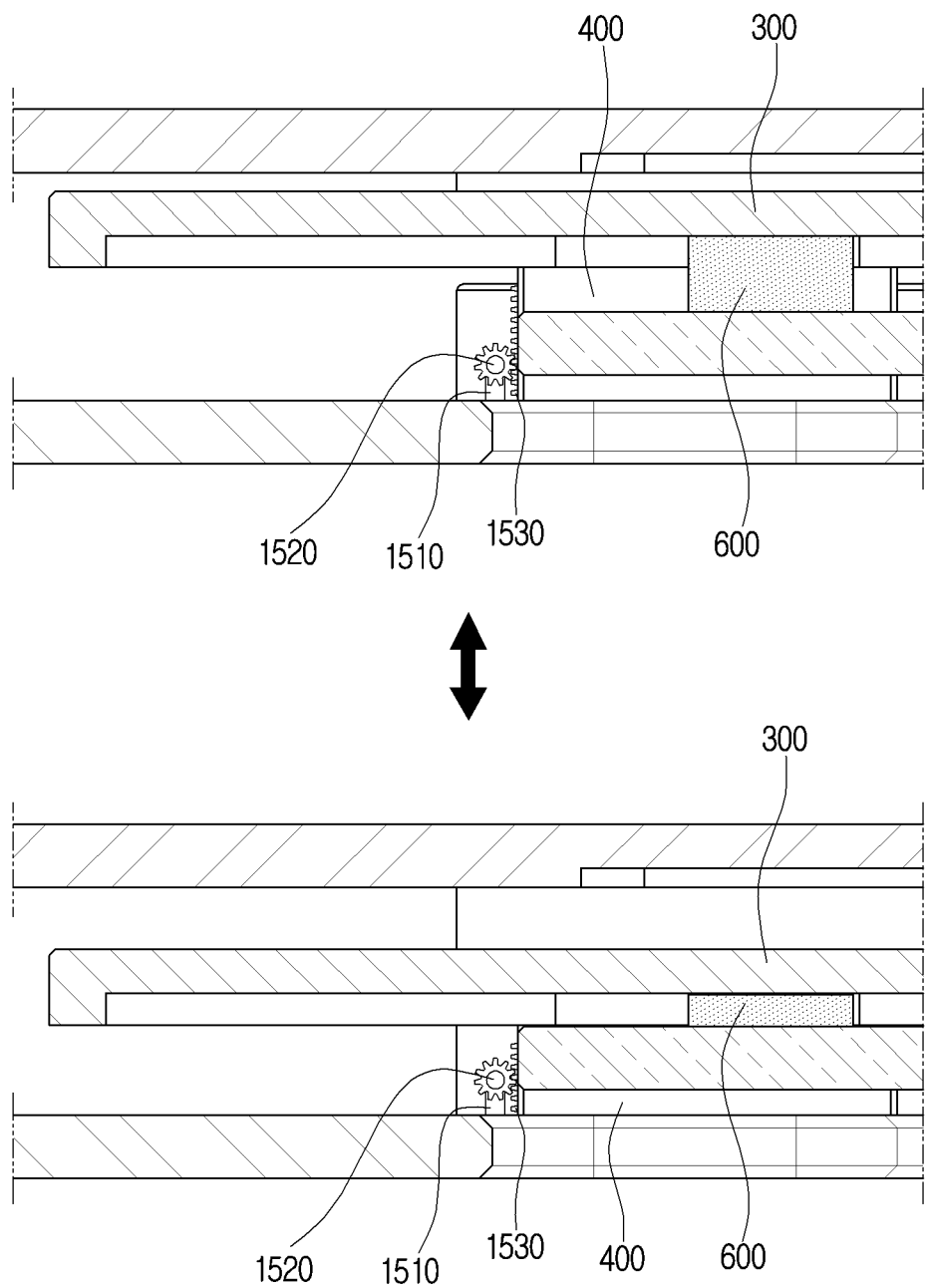
FIG. 14 is a cross-sectional diagram illustrating a structure of a damping force controlling device.

Referring to FIG. 14, the damping force controlling device 1500 may include a motor 1510, a worm gear 1520, and a rack gear 1530. The motor 1510 may rotate the worm gear 1520. The rack gear 1530 may be connected to a side of the second support link 40 and may be disposed to engage the worm gear 1520. As the motor 1510 is driven to rotate the worm gear 1520, the rack gear 1530 may move vertically to vary the length of the second support link 40.

When the length of the second support link 40 increases, the first support member 300 may rise, and when the length of the second support link 40 decreases, the first support member 300 may be lowered.

For example, when the first support member 300 rises, the elastic friction member 600 is less compressed, so that the normal force and frictional force acting on the elastic friction member 600 may be reduced, thereby reducing the damping force. In contrast, when the first support member 300 goes down, the elastic friction member 600 is further compressed, so that the normal force and frictional force acting on the elastic friction member 600 may be increased, thereby increasing the damping force.

The processor 1100 may then control the locking device 800 such that the food moving stage 1 is locked or unlocked based on the type of food placed on the second plate 200, or may control the damping force controlling device 1500 such that the vertical drag and frictional force of the elastic friction member 600 may be adjusted by increasing or decreasing the height of the first support member 300.

For example, if it is determined that liquid is included in the food placed on the food moving stage 1, the processor 1100 may control the locking device 800 to unlock the food moving stage 1 or control the damping force controlling device 1500 so that the height of the first support member 300 is lowered.

In addition, the processor 1100 may control the locking device 800 such that the food moving stage 1 is in a locked state when it is determined that the food placed on the food moving stage 1 is a solid food that does not contain liquid.

When it is determined that the food placed on the food moving stage 1 is at least one of stew, casserole, or soup, the processor 1100 may control the locking device 800 to unlock the food moving stage 1 or control the damping force controlling device 1500 so that the height of the first support member 300 is lowered.

The acceleration sensor 1210 may sense the acceleration of the first plate 100. Based on the information received from the acceleration sensor 1210, the processor 1100 may control the locking device 800 to allow relative movement of the first and second plates 100 and 200 when the first plate 100 vibrates or moves at or above a predetermined level.

For example, when vibration of a predetermined range of frequencies (e.g., 2 Hz to 4 Hz) is identified during the vibration of the second plate 200, the processor 1100 may determine that beverage is included in the food placed on the second plat 200, and may control the locking device 800 so as to enable relative movement of the first and second plates 100 and 20.

The serving robot apparatus 1000 may include an input device 1300 for receiving information about food to be served.

The input device 1300 may include, for example, at least one of a touch panel, a (digital) pen sensor, a key, or an ultrasonic input device. The touch panel, pen sensor, and the key may be provided in the display device 1030.

The touch panel may be used in relation to, for example, at least one of an electrostatic, a pressure-sensitive, infrared, or ultrasonic manner, and the touch panel may further include a control circuit. The touch panel may further include a tactile layer to provide a tactile response to the user. The (digital) pen sensor may, for example, be part of a touch panel or include a separate recognition sheet. The key may include, for example, a physical button, an optical key, or a keypad. The ultrasonic input device may detect ultrasonic wave generated by an input tool through, for example, a microphone, and may confirm data corresponding to the detected ultrasonic wave.

The input device 1300 may be a terminal device such as a remote controller, a smartwatch, a smart band, a wireless headset, a mobile phone, a smartphone, a tablet, or the like.

Based on the information received by the input device 1300, the processor 1100 may control the locking device 800 to move relative to the first and second plates 100 and 200 when it is determined that a predetermined food is included in the food placed on the second plate 200.

For example, the processor 1100 may control the locking device 800 to allow relative movement of the first and second plates 100 and 200 when it is determined that the food placed on the second plate 200 is included in the food placed on the second plate 200 based on the information received by the input device 1300.

The tilt detection sensor 1220 may sense a tilted surface in front of the serving robot apparatus 1000. The tilt detection sensor 1220 may be a three-dimensional (3D) depth camera or an inertial measurement unit (IMU) sensor, but is not limited thereto.

The tile detection sensor 1220 implemented with the 3D depth camera may capture an ambient environment of the serving robot apparatus 1000 to detect whether there is a tilted surface on a moving path of the serving robot apparatus 1000.

Alternatively, the tilt detection sensor 1220 implemented with the IMU sensor may sense the tilt angle of the serving robot apparatus 1000. If the tilt of the serving robot apparatus 1000 that is greater than or equal to a predetermined angle, is detected by the tilt detection sensor 1220, the processor 1100 may determine that a tilted surface exists in front of the serving robot apparatus 1000.

The processor 1100, based on the information received by the inclination detection sensor 1220, when it is confirmed that there is a tilted surface in front of the serving robot apparatus 1000, may control the locking device 800 to limit the relative movement of the first and second plates 100 and 200.

Therefore, a situation whereby the serving robot apparatus 1000 moves onto a tilted surface, the second plate 200 rapidly move due to gravity, with respect to the first plate 100 and the food placed on the second plate 200 may fall off the serving robot 1000.

The serving robot apparatus 1000 may further include a distance sensor 1400. The distance sensor 1400 may detect a distance between the serving robot apparatus 1000 and a surrounding obstacle. The distance sensor 1400 may be implemented as a Light Detection And Ranging (LiDAR) sensor, but the type is not limited thereto.

The serving robot apparatus 1000 may identify the location of the serving robot apparatus 1000 from among a pre-stored map based on a result of scanning the vicinity of the serving robot apparatus 1000 using the distance sensor 1400. The serving robot apparatus 1000 may obtain a map of a new area by using the distance sensor 1400 while driving in a new area of which a map is not stored.

The processor 1100 may control a driving device 1020 to move the main body 1010 to a target serving point along an optimal path without colliding with an obstacle, based on the location and map information obtained through the distance sensor 1400.

Figure 15:
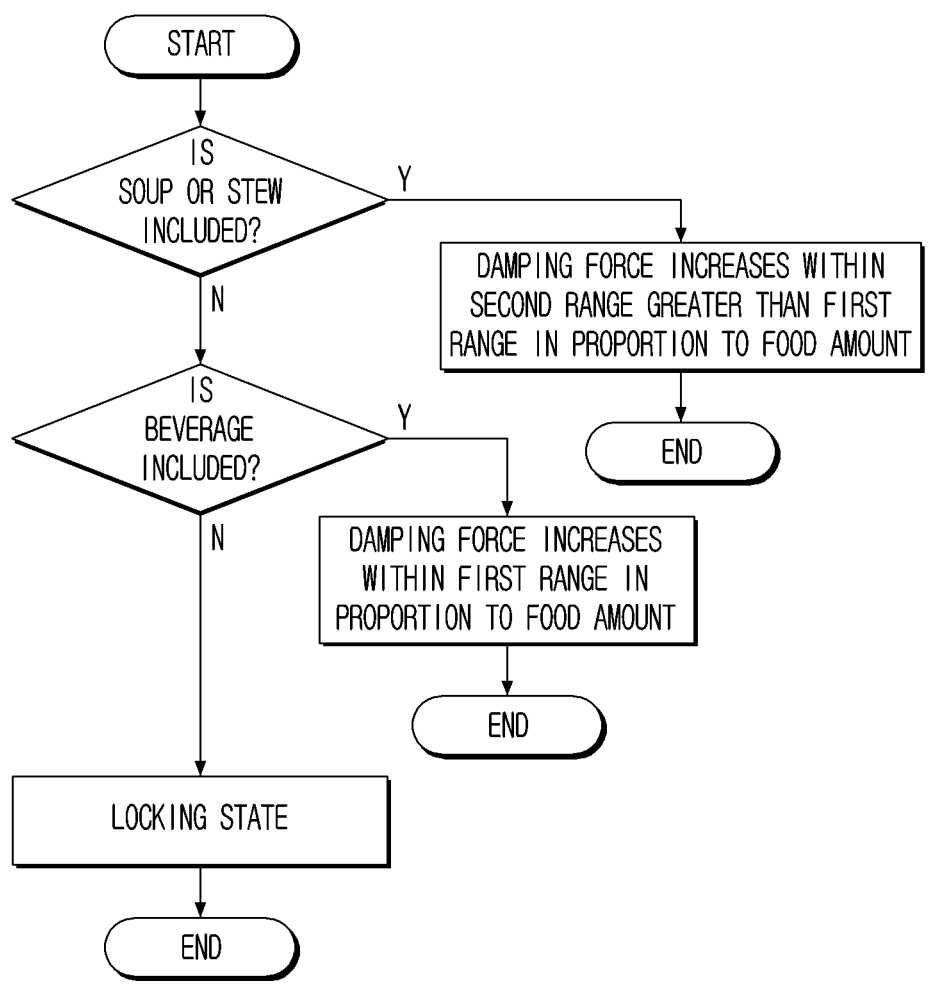
FIG. 15 is a flowchart illustrating a process of controlling damping force according to a type of food to be moved.

FIG. 15 is a flowchart illustrating a process of controlling damping force according to a type of food to be moved.

The camera 1230 may capture the surrounding environment of the serving robot apparatus 1000 or food placed on the second plate 200. The serving robot apparatus 1000 may recognize the surrounding environment based on the information collected by the camera, recognize an ambient environment, perform autonomous driving and information collection, and may transmit information to the user.

When it is confirmed by the processor 1100 that the food placed on the second plate 200 does not include any of soup, stew, and beverage in the food, based on the information received by the camera 1230, the processor 1100 may control the locking device 800 to limit the relative movement of the plates 100 and 200.

If the food placed on the second plate 200 is solid food with a low risk of being falling out from the container, the first and second plates 100 and 200 may be locked with each other, so that the second plate 200 may not vibrate unnecessarily and thus may securely move the solid food.

If it is identified by the processor 1100, based on the information received by the camera 1230, that at least one of soup, stew, and beverage is included in the food placed on the second plate 200, the processor 1100 may control the locking device 800 to enable relative movement of the second plates 100 and 200.

The processor 1100 may control the damping force controlling device 1500 to increase the damping force within the first range in proportion to the amount of food when it is confirmed that the food placed on the second plate 200 includes only beverage and the food placed on the second plate 200 does not include soup or stew.

The processor 1100 may control the damping force controlling device 1500 to increase the damping force within a second range greater than the first range in proportion to the amount of food when it is confirmed that the food placed on the second plate 200 includes soup or stew, based on the information received by the camera 1230.

The soup or stew may mean a liquid food which is contained in a low height bowl, a flat dish, or a dish. The soup or stew may have a relatively large size of a cup and a surface amplitude is large, and may resonate at a low frequency (e.g., 1 Hz or near).

In other words, as the damping force increases by the damping force controlling device 1500, the vibration of the food moving stage 1 sufficiently absorbs vibration of small frequencies, so that the soup or the stew may be securely moved while being placed on the to the food moving stage 1.

The beverage may refer to liquid food contained in a cup with a tall height. The beverage may have a relatively small surface amplitude as the size of the cup is small, and may resonate at a high frequency (e.g., around 3 HZ).

In other words, as the damping force is reduced by the damping force controlling device 1500, the food moving stage 1 may sufficiently absorb the vibration at high frequencies, so that the beverage may be securely moved while being placed in the food moving stage 1 without imparting vibration to the cup as much as possible.

The amount of food placed on the second plate 200 may be determined by the number of containers or cups among the information received by the camera 1230, or may be determined by the weight sensed by the weight sensor (not shown) disposed on the first plate 100 or the second plate 200.

When the damping force controlling device 1500 raises the first support member 300, the elastic friction member 600 is less compressed, thereby reducing the damping force. Conversely, when the damping force controlling device 1500 descends the first support member 300, the elastic friction member 600 is further compressed, thereby increasing the damping force.

For example, in the locking release state of the locking device 800 (i.e., when the relative movement of the first and second plates 100, 200 is possible), the damping force may be classified from the smallest one to six steps. For example, the damping force in the first to third steps may fall within the first range, and the damping force in the fourth to sixth steps may fall within the second range.

For example, if it is determined that the food placed on the second plate 200 includes three cups or more of beverage, the processor 1100 may control the damping force controlling device 1500 to have the damping force of the third step in the first range. Alternatively, if it is determined that the food placed on the second plate 200 includes only one cup of beverage, the processor 1100 may control the damping force controlling device 1500 to have the damping force of the first step in the first range.

For example, if it is determined that the food placed on the second plate 200 include three or more of dishes of soup or stew, the processor 1100 may control the damping force controlling device 1500 to have the damping force of the sixth step in the second range. Alternatively, the processor 1100 may control the damping force controlling device 1500 to have the damping force of the fourth step in the second range if it is determined that the food placed on the second plate 200 includes only one dish of soup or stew.

Accordingly, since the damping force is finely adjusted according to the amount of food as well as the type of food placed on the second plate 200, the food may be securely moved while being placed on the food moving stage 1 having the optimized damping force.

While the disclosure has been shown and described with reference to exemplary embodiments thereof, it will be understood by those of ordinary skill in the art that various changes in form and details may be made therein without departing from the spirit and scope of the disclosure claimed in the claims.

What is claimed is:

1. A food moving stage comprising:
   a first plate comprising an upper surface and a plurality of concavities formed on the upper surface;
   a second plate comprising a lower surface disposed to face the upper surface of the first plate;

a first support member connected to the upper surface of the first plate and disposed between the first plate and the second plate;

a second support member disposed between the first plate and the first support member;

a plurality of rolling members disposed at the plurality of concavities and in contact with the lower surface of the second plate; and an elastic friction member disposed on the upper surface of the second support member, and in a state in which the second plate moves away from the first plate, the elastic friction member is configured to be compressed and deformed by a lower surface of the first support member.

2. The food moving stage of claim 1, wherein the second support member is disposed to pass through a central axis of the second plate, and wherein the elastic friction member comprises a first elastic friction member disposed at one distal end of the second support member and a second elastic friction member disposed on another distal end of the second support member.

3. The food moving stage of claim 2, further comprising:
a support link configured to connect the second plate and the second support member and to which a central portion of the second support member is rotatably connected.

4. The food moving stage of claim 1, comprising:
a plurality of first pillar members connected to an upper surface of the first plate and formed with the plurality of concavities, respectively; and a plurality of second pillar members connected to a lower surface of the second plate and disposed to face the plurality of first pillar members, respectively, so as to form a space in which the rolling member is movably disposed.

5. The food moving stage of claim 4, wherein the second pillar member comprises an additional concavity having a shape that is symmetrical with a shape of the concavity.

6. The food moving stage of claim 1, wherein the plurality of concavities comprise a first concavity, a second concavity, a third concavity, and to a fourth concavity disposed in a grid shape, wherein the plurality of rolling members comprise a first roller disposed in the first concavity and the second concavity and a second roller disposed on the third concavity and the fourth concavity, and the food moving stage further comprises:

a third plate comprising an upper surface is disposed to face a lower surface of the first plate, and a fifth concavity, a sixth concavity, a seventh concavity, and an eighth concavity disposed respectively to positions corresponding to the first concavity, the second concavity, the third concavity, and the fourth concavity;

a third roller disposed in the fifth concavity and the eighth concavity and in contact with the lower surface of the first plate; and a fourth roller disposed in the sixth concavity and the seventh concavity and in contact with the lower surface of the first plate.

7. The food moving stage of claim 1, further comprising:
a locking device to selectively limit a relative movement of the first plate and the second plate.

8. The food moving stage of claim 7, further comprising:
a plurality of first pillar members connected to the upper surface of the first plate and formed with a plurality of concavities, respectively; and a plurality of second pillar members connected to the lower surface of the second plate, disposed to face the plurality of first pillar members, respectively, so as to form a space in which the rolling member is movably disposed, wherein the locking device comprises:
a rotary link rotatably disposed on the upper surface of the first plate; and
a first pressure link and a second pressure link connected to the rotary link to be in contact with side surfaces of the first pillar member and the second pillar member which move in opposite directions based on a rotation of the rotary link.

9. The food moving stage of claim 8, wherein the locking device further comprises a first guide member and a second guide member fixedly disposed at the upper surface of the first plate to guide a moving path of the first pressure link and the second pressure link, respectively, to rise as the first pressure link and the second pressure link get closer to the first pillar member and the second pillar member.

10. The food moving stage of claim 7, further comprising:
a plurality of first pillar members connected to the upper surface of the first plate and formed with the plurality of concavities, respectively; and a plurality of second pillar members connected to the lower surface of the second plate and disposed to face each of the plurality of first pillar members, to form a space in which the rolling member is movably disposed, wherein the locking device comprises:
a fitting member having a shape in which a cross-sectional area becomes smaller toward one end; and
a first pressure link and a second pressure link disposed at left and right sides of the one end of the fitting member, and based on the fitting member moving linearly, configured to move in opposite directions by being pushed by one end of the fitting member so as to be in contact with side surfaces of the first pillar member and the second pillar member; and
an elastic member to connect the first pressure link and the second pressure link.

11. The food moving stage of claim 7, wherein the locking device comprises:
a first block disposed on the upper surface of the first plate and comprising a first tilted surface;
a second block comprising a second tilted surface that engages the first tilted surface, and the second tilted surface is in contact by the first tilted surface and rises as the first block moves linearly; and
a third block connected to a lower surface of the second plate so that the raised second block is fitted.

* * * * *